US012791381B2

United States Patent
(12) United States Patent
Ota

(10) Patent No.: US 12,791,381 B2
(45) Date of Patent: Nov. 10, 2026

(54) PHOTOELECTRIC CONVERSION APPARATUS, IMAGING SYSTEM, AND MOVING OBJECT

(71) Applicant: CANON KABUSHIKI KAISHA, Tokyo (JP)

(72) Inventor: Yasuharu Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 18/798,264

(22) Filed: Aug. 8, 2024

(65) Prior Publication Data

US 2024/0393174 A1 Nov. 28, 2024

Related U.S. Application Data

(63) Continuation of application No. 17/865,218, filed on Jul. 14, 2022, now Pat. No. 12,078,534, which is a continuation of application No. 16/752,107, filed on Jan. 24, 2020, now Pat. No. 11,415,458.

(30) Foreign Application Priority Data

Jan. 30, 2019 (JP) ................................ 2019-014727

(51) Int. Cl.

| | |
|---|---|
| ***G01J 1/44*** | (2006.01) |
| ***G01C 11/00*** | (2006.01) |
| ***H04N 25/77*** | (2023.01) |

(52) U.S. Cl.

CPC ................ *G01J 1/44* (2013.01); *G01C 11/00* (2013.01); *H04N 25/77* (2023.01); *G01J 2001/4466* (2013.01)

(58) Field of Classification Search

CPC ................. G01J 1/44; G01J 2001/4466; G01J 2001/442; G01C 11/00; G01C 3/085; H04N 25/77; H04N 25/00; H04N 25/575; H04N 25/773

See application file for complete search history.

(56) References Cited

U.S. PATENT DOCUMENTS

| | | | | |
|---|---|---|---|---|
| 2018/0209846 | A1* | 7/2018 | Mandai | G01S 17/08 |
| 2018/0343406 | A1* | 11/2018 | Ikedo | H04N 25/53 |
| 2019/0305146 | A1* | 10/2019 | Kuroda | H10F 77/959 |
| 2020/0382726 | A1* | 12/2020 | Inaoka | H04N 25/50 |
| 2022/0075171 | A1* | 3/2022 | Anhut | G02B 21/0032 |

* cited by examiner

*Primary Examiner* — Monica T Taba

(74) *Attorney, Agent, or Firm* — Canon U.S.A., Inc. IP Division

(57) ABSTRACT

A photoelectric conversion apparatus includes a photodiode, a counter, a control circuit. The photodiode is configured to cause avalanche multiplication. The counter is configured to generate a count signal as a result of counting a pulse generated by the avalanche multiplication during a predetermined period. The control circuit is configured to perform control to bring the photodiode into a waiting state in which the avalanche multiplication is possible and a stop state in which the avalanche multiplication is stopped, based on the count signal during a predetermined period.

12 Claims, 14 Drawing Sheets

PHOTOELECTRIC CONVERSION APPARATUS, IMAGING SYSTEM, AND MOVING OBJECT

CROSS-REFERENCE TO RELATED APPLICATION

This application is a is a Continuation of U.S. application Ser. No. 17/865,218, filed Jul. 14, 2022, which is a Continuation of U.S. application Ser. No. 16/752,107, filed Jan. 24, 2020, now a U.S. Pat. No. 11,415,458 issued, Aug. 16, 2022; which claims priority from Japanese Patent Application No. 2019-014727, filed Jan. 30, 2019, which are hereby incorporated by reference herein in their entireties.

BACKGROUND

Field

One disclosed aspect of the embodiments relates to a photoelectric conversion apparatus, an imaging system, and a moving object.

Description of the Related Art

A photon-counting photoelectric conversion apparatus is known that digitally counts the number of photons incident on a light reception unit configured to cause avalanche multiplication, and outputs this counted value from a pixel as a digital signal. International Publication No. 2014/097519 discusses an operation in which, after the photodiode causes the avalanche multiplication, an operation of recharging the photodiode to cause the avalanche multiplication again is stopped during a predetermined period.

International Publication No. 2014/097519 fails to take into consideration a reduction in power consumption at the pixel corresponding to a luminance of incident light, thereby lacking setting of a stop operation corresponding to an increase in the count value. Therefore, this technique involves such a problem that the power consumption increases at the pixel when the avalanche multiplication is caused frequently, in a case where, for example, light with high illuminance is incident on the pixel.

SUMMARY

According to an aspect of the embodiments, a photoelectric conversion apparatus includes a photodiode, a counter, and a control circuit. The photodiode is configured to cause avalanche multiplication. The counter is configured to count a pulse generated by the avalanche multiplication during a predetermined period and generate a count signal having a count value. The control circuit is configured to perform control to bring the photodiode into a waiting state in which the avalanche multiplication is possible and a stop state in which the avalanche multiplication is stopped. The control circuit is configured to perform control to set higher a ratio of a length of a period during which the photodiode is in the stop state, to a length of a period during which the photodiode is in the waiting state for a period after the count value reaches the threshold value, than a period before the count value reaches the threshold value.

Further features of the disclosure will become apparent from the following description of exemplary embodiments with reference to the attached drawings.

DESCRIPTION OF THE EMBODIMENTS

The following disclosure relates to the reduction in the power consumption at the pixel that causes the avalanche multiplication.

A photoelectric conversion apparatus and a method for driving it according to a first exemplary embodiment of the disclosure will be described with reference to FIGS. 1 to 3.

Figure 1:
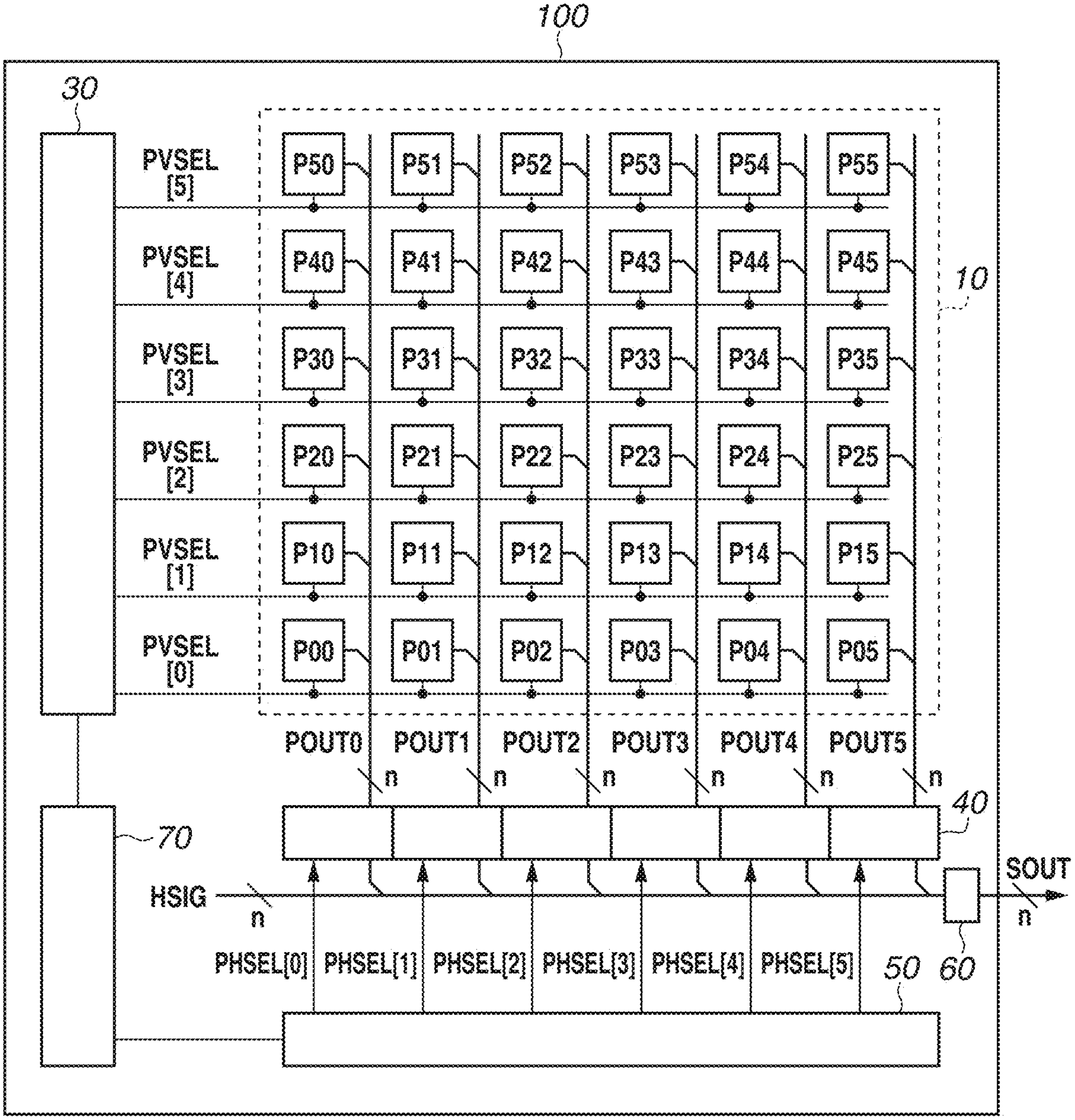
FIG. 1 is a block diagram illustrating a schematic configuration of a photoelectric conversion apparatus.

FIG. 1 is a block diagram illustrating a schematic configuration of the photoelectric conversion apparatus according to the present exemplary embodiment. FIG. 2 is a block diagram illustrating a schematic configuration of a pixel in the photoelectric conversion apparatus according to the present exemplary embodiment. FIG. 3 is a circuit diagram illustrating an example of a configuration of the pixel in the photoelectric conversion apparatus according to the present exemplary embodiment.

As illustrated in FIG. 1, the photoelectric conversion apparatus 100 according to the present exemplary embodiment includes a pixel region 10, a vertical selection circuit 30, signal processing circuits 40, a horizontal selection circuit 50, an output circuit 60, and a control circuit 70.

A plurality of pixels P, which is laid out in a matrix form across a plurality of row directions and a plurality of column directions, is provided in the pixel region 10. FIG. 1 illustrates 36 pixels P laid out in six rows from a zeroth row to a fifth row and six columns from a zeroth column to a fifth column together with reference numerals indicating row numbers and column numbers. For example, a reference numeral "P14" is assigned to the pixel P laid out in the first row and the fourth column.

The number of rows and the number of columns in the pixel array forming the pixel region 10 are not especially limited. Further, the pixels P do not necessarily have to be laid out two-dimensionally in the pixel region 10. For example, the pixel region 10 may include one pixel P, or the pixels P may be laid out one-dimensionally in the row direction or the column direction in the pixel region 10.

A control line PVSEL is arranged for each of the rows in the pixel array in the pixel region 10 while extending in a first direction (a horizontal direction in FIG. 1). The control line PVSEL is connected to each of the pixels P lined in the first direction, and serves as a common signal line shared among these pixels P. The first direction in which the control line PVSEL extends may be referred to as the row direction or the horizontal direction. FIG. 1 illustrates the control line PVSEL together with a reference numeral indicating the row number. For example, a reference numeral "PVSEL[1]" is assigned to the control line PVSEL of the first row.

The control line PVSEL of each row is connected to the vertical selection circuit 30. The vertical selection circuit 30 is a circuit unit that supplies a control signal for driving a signal generation circuit (not illustrated) in the pixel P to the pixel P via the control line PVSEL. The vertical scanning circuit 30 controls a start and an end of a period during which a counter included in the pixel 11, which will be described below, cumulates a count.

An output line POUT is arranged for each column in the pixel array in the pixel region 10 while extending in a second direction (a vertical direction in FIG. 1) intersecting with the first direction. The output line POUT is connected to each pixel P lined in the second direction, and serves as a common signal line shared among the pixels P. The second direction in which the output line POUT extends may be referred to as the column direction or the vertical direction. FIG. 1 illustrates the control line POUT together with a reference numeral indicating the column number. For example, a reference numeral "POUT4" is assigned to the output line POUT of the fourth column. Each of the output lines POUT includes n signal lines for outputting an n-bit digital signal.

The output lines POUT are connected to the signal processing circuits 40. Each of the signal processing circuits 40 is provided corresponding to each column in the pixel array in the pixel region 10, and is connected to the output line POUT of the corresponding column. The signal processing circuit 40 has a function of holding the signal output from the pixel P via the output line POUT of the column corresponding thereto. The signal output from the pixel P is the n-bit signal input via the n signal lines in the output line POUT, and, therefore, each of the signal processing circuits 40 includes at least n holding units for holding the signal of each bit.

The horizontal selection circuit 50 is a circuit unit that supplies a control signal for reading out the signal from the signal processing circuit 40, to the signal processing circuit 40. The horizontal selection circuit 50 supplies the control signal to the signal processing circuit 40 of each column via a control line PHSEL. Upon receiving the control signal from the horizontal selection circuit 50, the signal processing circuit 40 outputs the signal held in the holding unit to the output circuit 60 via a horizontal output line HSIG. FIG. 1 illustrates the control line PHSEL together with a reference numeral indicating the column number. For example, a reference numeral "PHSEL[4]" is assigned to the control line PHSEL of the fourth column. The horizontal output line HSIG includes n signal lines for outputting the n-bit digital signal.

The output circuit 60 is a circuit unit for outputting the signal supplied via the horizontal output line HSIG to the outside of the photoelectric conversion apparatus 100 as an output signal SOUT. The control circuit 70 is a circuit unit for supplying control signals for controlling operations and the timings of the vertical selection circuit 30, the signal processing circuits 40, the horizontal selection circuit 50, and the output circuit 60. At least a part of the control signals for controlling the operations and the timings of the vertical selection circuit 30, the signal processing circuits 40, the horizontal selection circuit 50, and the output circuit 60 may be supplied from the outside of the photoelectric conversion apparatus 100.

Figure 2:
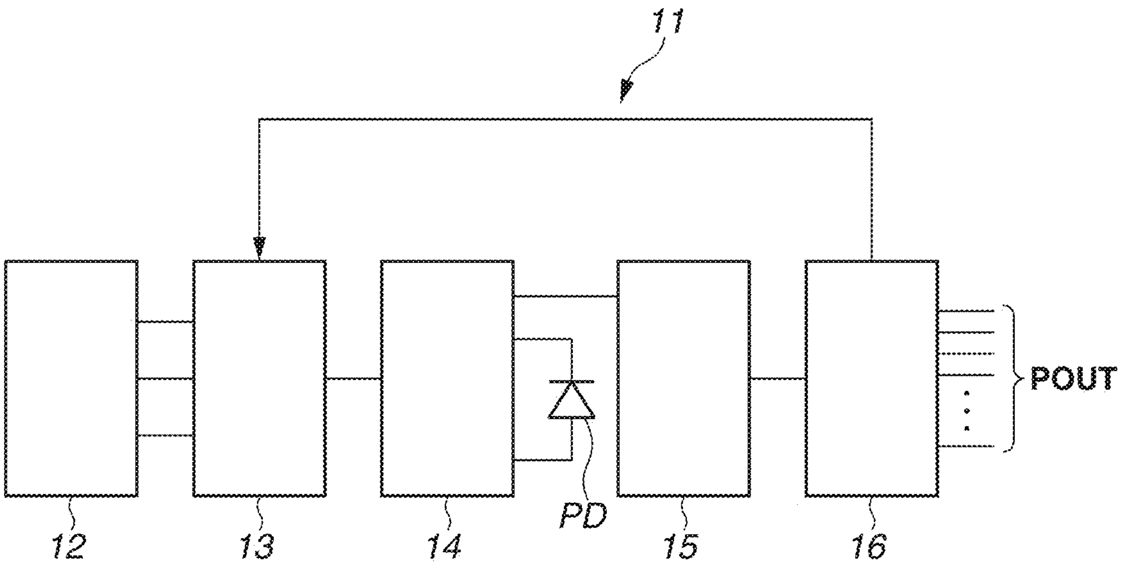
FIG. 2 illustrates a schematic configuration of a pixel.
Figure 3:
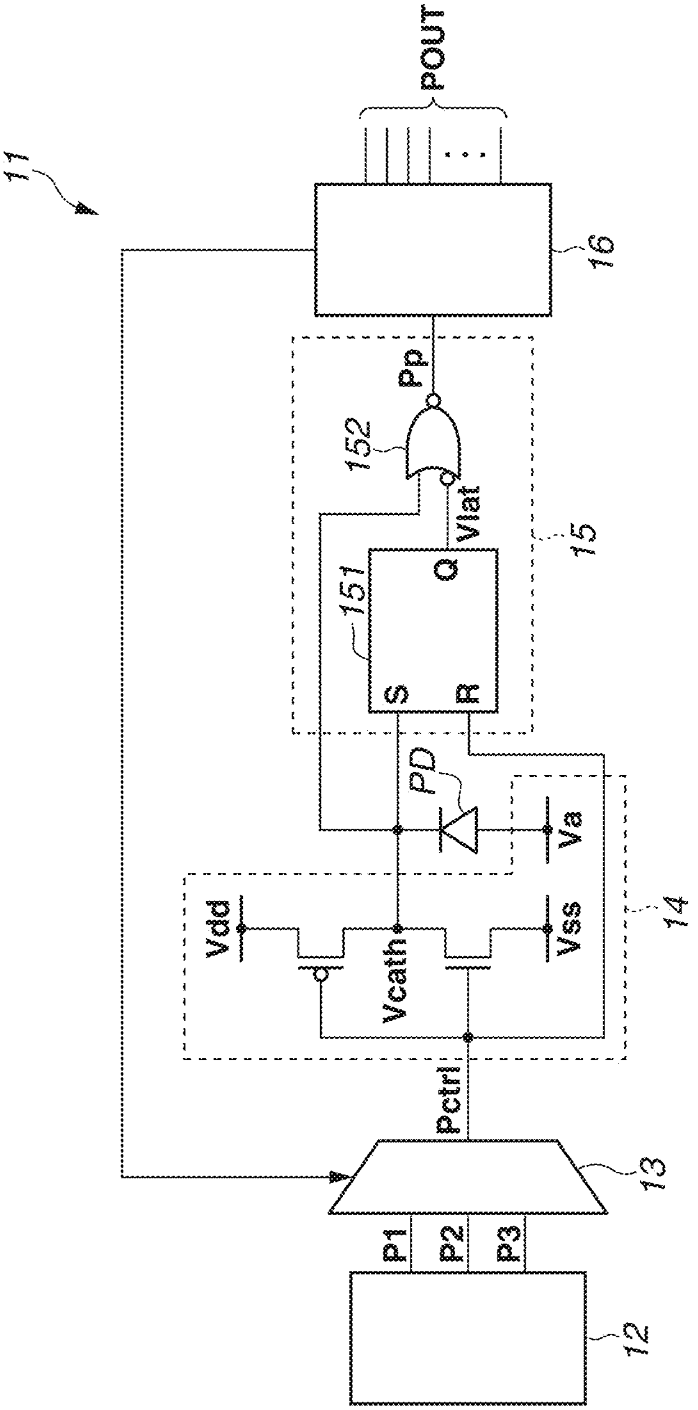
FIG. 3 illustrates an example of a configuration of the pixel.

As illustrated in FIG. 2, each pixel P includes an avalanche multiplication-type photodiode PD, a pixel control circuit 12, a selector 13, a photodiode (PD) control circuit 14, a waveform generation circuit 15, and a counter 16.

In the present disclosure, the pixel control circuit 12 and the PD control circuit 14 may be referred to as a control signal generation unit and a cathode voltage control unit, respectively.

An example of the configuration of the pixel will be described with reference to FIG. 3.

The pixel control circuit 12 outputs signals P1, P2, and P3 to the selector 13. The selector 13 outputs any signal of the signals P1, P2, and P3 input from the pixel control circuit 12 to the PD control circuit 14 as a signal Pctrl.

The PD control circuit 14 includes a positive metal-oxide-semiconductor (PMOS) transistor and a negative metal-oxide-semiconductor (NMOS) transistor connected in series in an electric path between a voltage Vdd and a voltage Vss. The voltage Vdd is set to a voltage of approximately 3 V in the present exemplary embodiment. On the other hand, the voltage Vss is set to a ground voltage, and Va is set to a voltage of approximately −20 V. The voltages Vdd, Vss, and Va are changed as necessary.

The signal Pctrl is input to a gate of each of these PMOS transistor and NMOS transistor. The PMOS transistor is a recharging circuit for performing a recharging operation of returning a voltage Vcath to a voltage around the voltage Vdd after the voltage Vcath reduces due to the avalanche multiplication. The return of the voltage Vcath to the voltage around the voltage Vdd brings the photodiode PD into a state ready for the avalanche multiplication (a state waiting for the avalanche multiplication). In the present disclosure, a period during which the photodiode PD is in the state waiting for the avalanche multiplication, and a period during which the photodiode PD is in an avalanche multiplication stopped state will be referred to as a waiting period and a stop period, respectively.

A cathode of the photodiode PD and the waveform generation circuit 15 are connected to a node to which the PMOS transistor and the NMOS transistor are connected.

An anode terminal of the photodiode PD is connected to a power source node of the voltage Va. The voltage Va is typically a negative high voltage. The cathode of the photodiode PD is connected to the PD control circuit 14. A voltage at the cathode of the photodiode PD will be referred to as the voltage Vcath.

The waveform generation circuit 15 includes a Set-Reset (SR) latch circuit 151 and a Not-OR (NOR) circuit 152. The cathode of the photodiode PD is connected to an S terminal of the SR latch circuit 151, and the voltage Vcath is input thereto. The signal Pctrl is input to an R terminal. An input unit of the NOR circuit 152 is connected to the cathode of the photodiode PD and the SR latch circuit 151. The voltage Vcath and a signal generated by inverting a signal Vlat output from the SR latch circuit 151 are input to the NOR circuit 152. An output unit of the NOR circuit 152 is connected to the counter 16. The counter 16 counts and cumulates a pulse of a signal Pp output from the NOR circuit 152 during a predetermined period (a period set by the vertical selection circuit 30). The counter 16 outputs a count signal that is a result of cumulating the count to the outside of the pixel as a signal POUT. The cumulation period during which the counter 16 cumulates the count that is set by the vertical selection circuit 30 can be set to, for example, a period corresponding to one frame of an image formed by using a signal output from the photoelectric conversion apparatus 100. As another configuration, the cumulation period can also be set by dividing the one frame into a plurality of fields and defining a period corresponding to one field among the plurality of fields as the period during which the counter 16 cumulates the count. The counter 16 cumulates the count during a period from a start to an end of the cumulation period. After the cumulation is ended and the readout of the signal POUT is ended, the count signal of the counter 16 is reset to an initial value.

The counter 16 is also connected to the selector 13. The selector 13 switches to a signal which should be selected as the signal Pctrl, among the signals P1 to P3 based on whether the count value of the counter 16 reaches a threshold value. In other words, the selector 13 is a control circuit that switches to the signal which should be output among the signals P1 to P3 based on the count signal. Thus, the selector 13 is a selection circuit that switches between the waiting state for causing the avalanche multiplication and the stopped state in which the avalanche multiplication is stopped based on the count signal.

The photodiode PD generates an avalanche current in reaction to an entry of photons when a reverse bias voltage applied between the anode and the cathode is equal to or higher than a breakdown voltage Vbd. Due to a flow of the avalanche current in the photodiode PD, the voltage Vcath at the cathode of the photodiode PD changes. The change in the voltage Vcath leads to a change in the signal of the signal Pp that the waveform generation circuit 15 outputs, thereby causing an output of a photon detection pulse to the counter 16.

When the signal Pctrl output from the selector 13 is at a Low level, the PD control circuit 14 performs the recharging operation upon a reduction of the voltage Vcath due to the avalanche current. More specifically, an electric current flows from the node of the voltage Vdd to the node of the voltage Vcath via the PMOS transistor, and the voltage Vcath increases. Then, the voltage between the anode and the cathode of the photodiode PD matches or exceeds the breakdown voltage Vbd again. As a result, the photodiode PD is brought into a state ready to perform the avalanche multiplication operation again.

On the other hand, when the signal Pctrl is in a High-level state, the voltage Vcath is kept constant at a value around the voltage Vss. Therefore, the photodiode PD is brought into the stop state in which the photodiode PD does not cause the avalanche multiplication.

In the present exemplary embodiment, an operation of shifting the signal level of the signal Pctrl output from the selector 13, from the Low level to the High level is performed when the count value of the counter 16 reaches the threshold value. Then, the pixel according to the present exemplary embodiment increases the stop period of the avalanche multiplication in correspondence with an increase in the count value.

Figure 4:
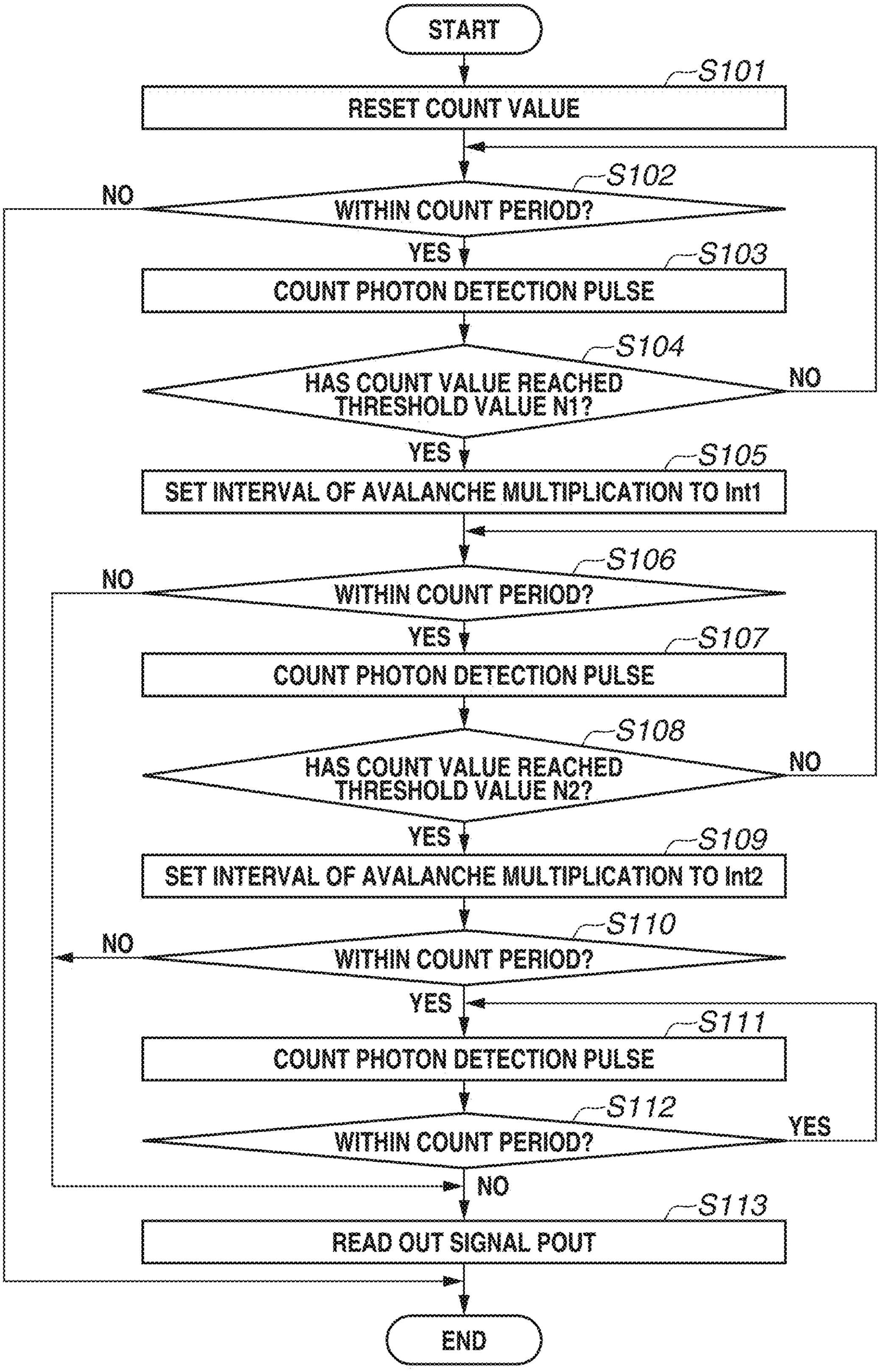
FIG. 4 is a flowchart illustrating an operation of the pixel.

FIG. 4 is a flowchart illustrating the operation of the pixel according to the present exemplary embodiment.

In step S101, the control circuit (not illustrated) resets the count value of the counter 16 to the initial value. Typically, in the initial value, all bit values are zero.

If the current time is within the count period during which the counter 16 carries out counting in step S102 (YES in step S102), the operation proceeds to step S103. On the other hand, if the current time is not within the count period (NO in step S102), the operation is ended.

In step S103, the counter 16 performs the operation of counting the pulse of the signal Pp.

In step S104, the operation branches based on whether the count value of the counter 16 reaches a threshold value N1.

If the count value does not reach the threshold value N1 (NO in step S104), the operation returns to step S102 again. On the other hand, if the count value reaches the threshold value N1 (YES in step S104), the operation proceeds to step S105.

In step S105, an interval of the avalanche multiplication is set to an interval Int1. As will be described below, the setting of the interval is carried out by making a setting such that the signal is output from the selector 13 as the signal Pctrl to the signal P2. In other words, it can also be stated that an avalanche stop period that lasts for the length Int1 is interposed between the avalanche waiting periods.

If the current time is within the count period during which the counter 16 keeps counting in step S106 (YES in step S106), the operation proceeds to step S107. On the other hand, if the current time is not within the count period (NO in step S106), the operation proceeds to step S113.

In step S107, the counter 16 performs the operation of counting the pulse of the signal Pp.

In step S108, the operation branches based on whether the count value of the counter 16 reaches a threshold value N2. If the count value does not reach the threshold value N2 (NO in step S108), the operation returns to step S106 again. On the other hand, if the count value reaches the threshold value N2 (YES in step S108), the operation proceeds to step S109.

In step S109, the interval of the avalanche multiplication is set to an interval Int2 that is longer than the interval Int1. As will be described below, the setting of the interval is carried out by making a setting such that the signal is output from the selector 13 as the signal Pctrl to the signal P3. In other words, it can also be stated that an avalanche stop period that lasts for the length Int2 is interposed between the avalanche waiting periods.

If the current time is within the count period during which the counter 16 keeps counting in step S110 (YES in step S110), the operation proceeds to step S111. On the other hand, if the current time is not within the count period (NO in step S110), the operation proceeds to step S113.

In step S111, the counter 16 performs the operation of counting the pulse of the signal Pp.

If the current time is within the count period during which the counter 16 keeps counting in step S112 (YES in step S112), the operation returns to step S111, from which the count operation continues. On the other hand, if the current time is not within the count period (NO in step S112), the operation proceeds to step S113.

In step S113, the count value is output from the counter 16 to the outside of the pixel as the signal POUT. After that, the operation is ended.

Figure 5:
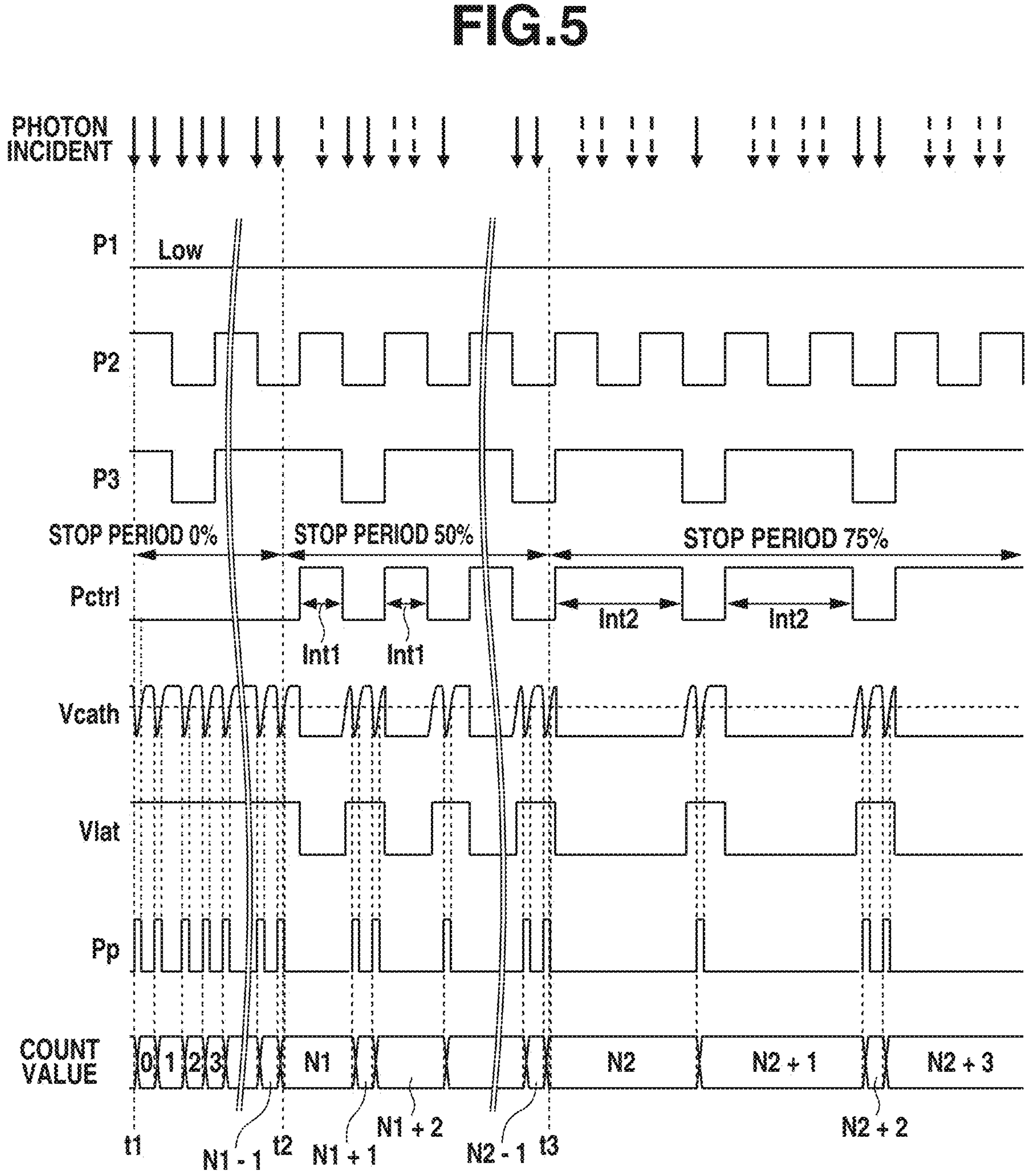
FIG. 5 is a timing chart illustrating the operation of the pixel.

FIG. 5 is a timing chart illustrating the operation of the pixel according to the present exemplary embodiment. Each of reference numerals illustrated in FIG. 5 corresponds to each of the signals illustrated in FIG. 3.

At time t1, the selector 13 selects the signal P1 as the signal Pctrl.

When photons are incident on the photodiode PD, the avalanche multiplication occurs and the voltage Vcath reduces. Since the signal Pctrl input into the R terminal of the SR latch circuit 151 is at the Low level, the signal Vlat is kept at the High level regardless of the level of the voltage Vcath input into the S terminal.

A signal in which the signal Vlat is inverted, i.e., a signal at the Low level is input to the NOR circuit 152. Therefore, when the voltage Vcath falls below a voltage corresponding to a logical threshold value of the NOR circuit 152, the signal Pp output from the NOR circuit 152 is switched to the High level. On the other hand, when the voltage Vcath exceeds the logical threshold value of the NOR circuit 152 due to the recharging operation, the signal Pp is switched to the Low level.

The counter 16 increments the count value by one every time the signal Pp is switched from the Low level to the High level.

At time t2, the count value reaches the threshold value N1. When the count value reaches the threshold value N1, the selector 13 selects the signal P2 as the signal to be output as the signal Pctrl. As a result, the signal Pctrl becomes a signal having the interval Int1 between the transition from the Low level to the High level and the transition to the Low level again.

As described above, the PD control circuit 14 performs the recharging operation of returning the voltage Vcath to the voltage Vdd upon the reduction in the voltage Vcath while the signal Pctrl is at the Low level. On the other hand, the voltage Vcath is kept constant at the voltage (the Low level) around the voltage Vss while the signal Pctrl is the High level.

The signal Vlat is kept at the Low level while the voltage Vcath input into the S terminal is at the Low level and the signal Pctrl input into the R terminal is at the High level. When the signal Pctrl is switched to the Low level and the voltage Vcath is switched to the High level, the signal Vlat is switched to the High level again.

In this manner, the pixel is configured to stop the avalanche multiplication caused by the photodiode PD at the interval Int1 when the count value reaches the threshold value N1.

In a period from time t2 to time t3, 50% are set to both the period during which the avalanche multiplication is caused and the period during which the avalanche multiplication is stopped. In other words, the avalanche waiting period that lasts for a first length and the stop period of the avalanche multiplication that lasts for the same first length are sequentially and alternately set.

After that, the count value reaches the threshold value N2 at time t3. When the count value reaches the threshold value N2, the selector 13 selects the signal P3 as the signal to be output as the signal Pctrl. As a result, the signal Pctrl becomes a signal having the interval Int2 between the transition from the Low level to the High level and the transition to the Low level again.

An operation at this time is similar to the operation from time t2 to time t3 except that the interval in which the photodiode PD stops the avalanche multiplication is extended from the interval Int1 to the interval Int2.

In a period after time t3, 25% and 75% are set as the ratio occupied by the period during which the avalanche multiplication is caused, and the ratio occupied by the period during which the avalanche multiplication is stopped. In other words, the avalanche waiting period that lasts for the first length and the stop period of the avalanche multiplication that lasts for a second length which is longer than the first length (three times as long as the first length in the present exemplary embodiment) are sequentially and alternately set.

In such a manner, the photoelectric conversion apparatus 100 according to the present exemplary embodiment increases the interval (i.e., the length of the stop period) between the periods during which the avalanche multiplication is caused (the waiting periods) according to the increase in the count value. In other words, the photoelectric conversion apparatus 100 performs control such that the ratio of the length of the period during which the photodiode PD is in the stop state is set higher than the length of the period during which the photodiode PD is in the waiting state. In other words, when the period after the count value reaches the threshold is compared with the period before the count value reaches the threshold value, the former period is longer than the latter period.

In such a manner, the photoelectric conversion apparatus 100 according to the present exemplary embodiment reduces the number of times that the avalanche multiplication is caused when light with high illuminance is incident. As a result, the power consumption can be reduced at the pixel.

The count signal of the counter 16 does not have to be output to the selector 13 with respect to all of the bits. For example, the photoelectric conversion apparatus 100 may be configured such that only a signal of the most significant bit corresponding to the threshold value is output to the selector 13. In the case of this configuration, the intended effects can be achieved by configuring the selector 13 to change the signal to be output as the signal Pctrl in reaction to a change in the signal level of the most significant bit corresponding to the threshold value.

Further, as another example, the photoelectric conversion apparatus 100 may include a comparison unit that indicates a result of comparing the count value of the counter 16 and the threshold value. A signal output from this comparison unit is input to the selector 13. The intended effects can be achieved by configuring the selector 13 to change the signal to be output as the signal Pctrl in reaction to a change in the signal output from the comparison unit.

Next, processing for correcting the signal POUT output from the pixel according to the present exemplary embodiment will be described.

Figure 6:
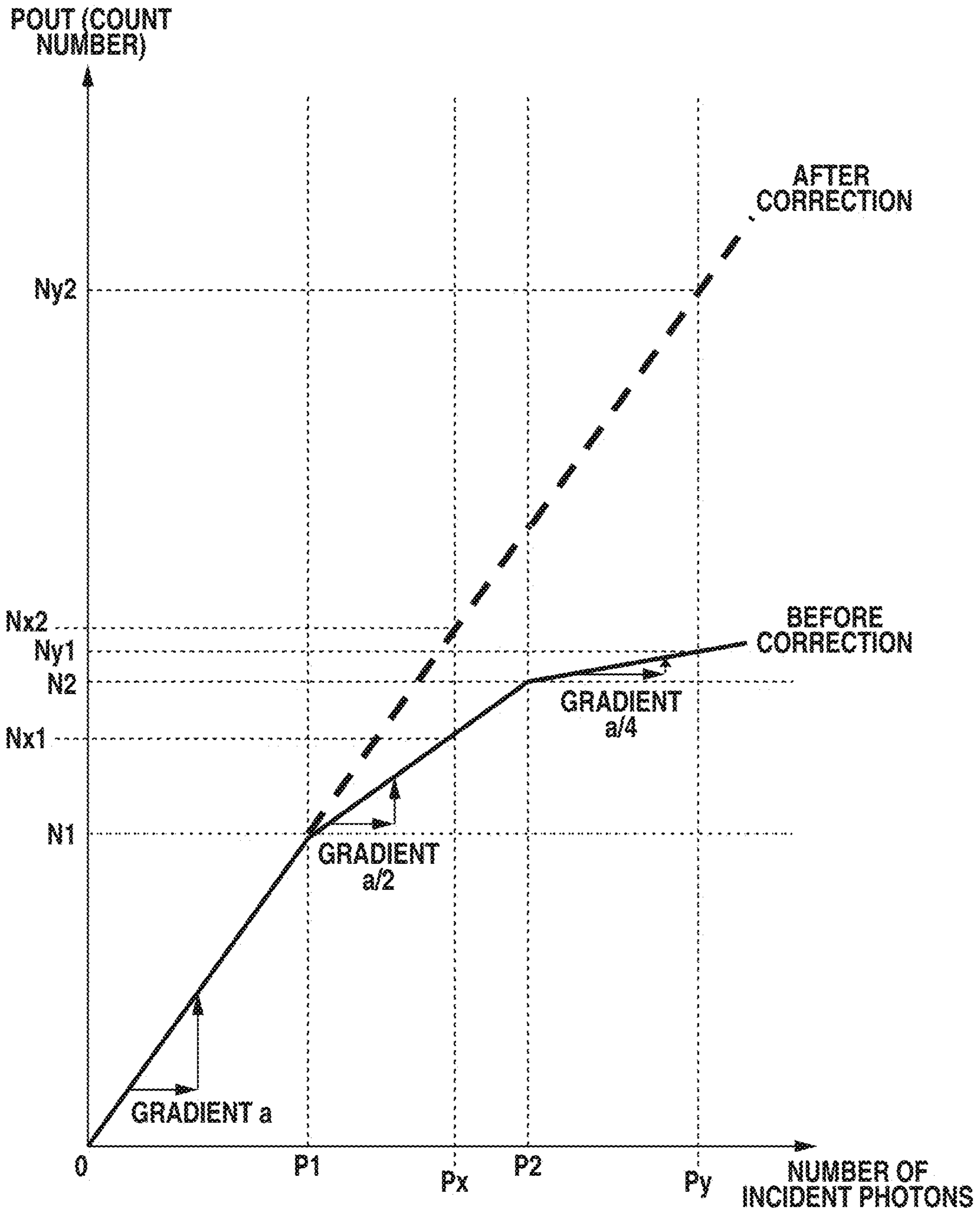
FIG. 6 illustrates a relationship between the number of incident photons and a count signal.

FIG. 6 illustrates a relationship between the number of photons incident on the photodiode PD and the signal POUT.

Until the signal POUT reaches the threshold value N1, a gradient of the number of incident photons and the signal POUT has a relationship of a gradient a. Ideally, if the counter 16 counts all photons incident on the photodiode PD without any omission, the gradient a is one, and the number of photons P1 and the threshold value N1 match each other.

When the signal POUT reaches the threshold value N1, the avalanche waiting period that lasts for the first length and the stop period of the avalanche multiplication that lasts for the same first length are alternately set as described above. Therefore, the gradient of the signal POUT with respect to the number of incident photons reduces to a/2. Being generalized, the gradient is expressed as the gradient a×the length of the avalanche waiting period/(the length of the avalanche waiting period+the length of the avalanche stop period). When n represents the length of the avalanche waiting period/(the length of the avalanche waiting period+the length of the avalanche stop period), the gradient is expressed as a/n. In the present exemplary embodiment, n is 2.

When the signal POUT reaches the threshold value N2, the avalanche waiting period that lasts for the first length and the stop period of the avalanche multiplication that lasts for the second length which is longer than the first length (three times as long as the first length in the present exemplary embodiment) are alternately set as described above. Therefore, the gradient of the signal POUT with respect to the number of incident photons reduces to a/4. Being generalized, the gradient is expressed as the gradient a×the length of the avalanche waiting period/(the length of the avalanche waiting period+the length of the avalanche stop period). When m represents the length of the avalanche waiting period/(the length of the avalanche waiting period+the length of the avalanche stop period), the gradient is expressed as a/m. In the present exemplary embodiment, m is 4.

The processing for correcting the signal POUT is performed when the count value Nx is greater than the threshold value N1. In the present exemplary embodiment, a count value at which the gradient of the signal POUT with respect to the number of incident photons falls in a range different from the gradient a is corrected so as to match the gradient a.

The count value of the signal POUT corresponding to the number of incident photons Px (Px satisfies P1<Px<P2) is acquired as Nx1. The count value Nx1 before the correction, is corrected to acquire a count value Nx2 after the correction in the following manner.

$$Nx2 = n \cdot Nx1 - (n-1) \cdot N1 \tag{1}$$

Since n is n=2 in the present exemplary embodiment, $$Nx2 = 2Nx1 - N1 \tag{2}$$

is derived from equation (1).

Further, the count value of the signal POUT corresponding to the number of incident photons Py (Py satisfies P2<Py) is acquired as Ny1. This count value Ny1 before the correction is corrected to acquire a count value Ny2 after the correction in the following manner.

$$Ny2 = m \cdot Ny1 - (m-n) \cdot N2 - (n-1) \cdot N1 \tag{3}$$

Then, since m=4 and n=2, in the present exemplary embodiment, $$Ny2 = 4Ny1 - 2N2 - N1 \tag{4}$$

is derived from equation (3).

The signal POUT corresponding to the number of incident photons having the relationship of the gradient a can be acquired as illustrated in FIG. 6 by correcting the signal POUT in this manner.

The correction unit that performs the correction processing may be the signal processing circuit 40 of the photoelectric conversion apparatus 100 illustrated in FIG. 1 or may be the output circuit 60. Alternatively, a signal processing circuit provided outside the photoelectric conversion apparatus 100 may serve as the correction unit that performs the correction processing.

In this manner, the photoelectric conversion apparatus 100 according to the present exemplary embodiment can reduce the power consumption of the pixel by reducing the number of times of the avalanche multiplication when the light with high illuminance is incident. Further, the photoelectric conversion apparatus 100 can acquire the count value corresponding to the number of photons incident on the photodiode PD by correcting the signal POUT output from the pixel.

In the present exemplary embodiment, the length of the avalanche stop period is changed by using the two threshold values N1 and N2. The threshold value used therefor is not limited to this example. The threshold value may be only one or may be more than that value. Further, when the threshold value is provided, it is desirable to set the avalanche waiting period and the avalanche stop period in such a manner that the gradient of the number of incident photons and the signal POUT illustrated in FIG. 6 has a relationship of ½n. This is because such a setting can facilitate the calculation in the processing for correcting the count value that has been described with reference to FIG. 6.

In the present exemplary embodiment, the photoelectric conversion apparatus 100 has been described in which the configuration of the pixel 11 is all mounted on one semiconductor substrate as illustrated in FIG. 1. However, the configuration of the pixel is not limited to this example. The pixel may be configured in the following manner. The photodiode PD is mounted on a first semiconductor substrate, and the counter 16 is mounted on another second semiconductor substrate. Then, the pixel is configured as a stacked sensor in which the first semiconductor substrate and the second semiconductor substrate are stacked. The pixel control circuit 12, the selector 13, the PD control circuit 14, or the waveform generation circuit 15 can be mounted on any of the first semiconductor substrate and the second semiconductor substrate.

As another example, the photodiode PD is mounted on the first semiconductor substrate, and the pixel control circuit 12, the selector 13, the PD control circuit 14, and the waveform generation circuit 15 are mounted on the second semiconductor substrate. In this case, the photodiode PD on the first semiconductor substrate and the PD control circuit 14 on the second semiconductor substrate are connected to each other via a connection node between the substrates. Further, the photodiode PD on the first semiconductor substrate and the waveform generation circuit 15 on the second semiconductor substrate are connected to each other via another connection node.

In the following description, a second exemplary embodiment will be described. A photoelectric conversion apparatus according to the present exemplary embodiment will be described, focusing on differences from the first exemplary embodiment.

Figure 7:
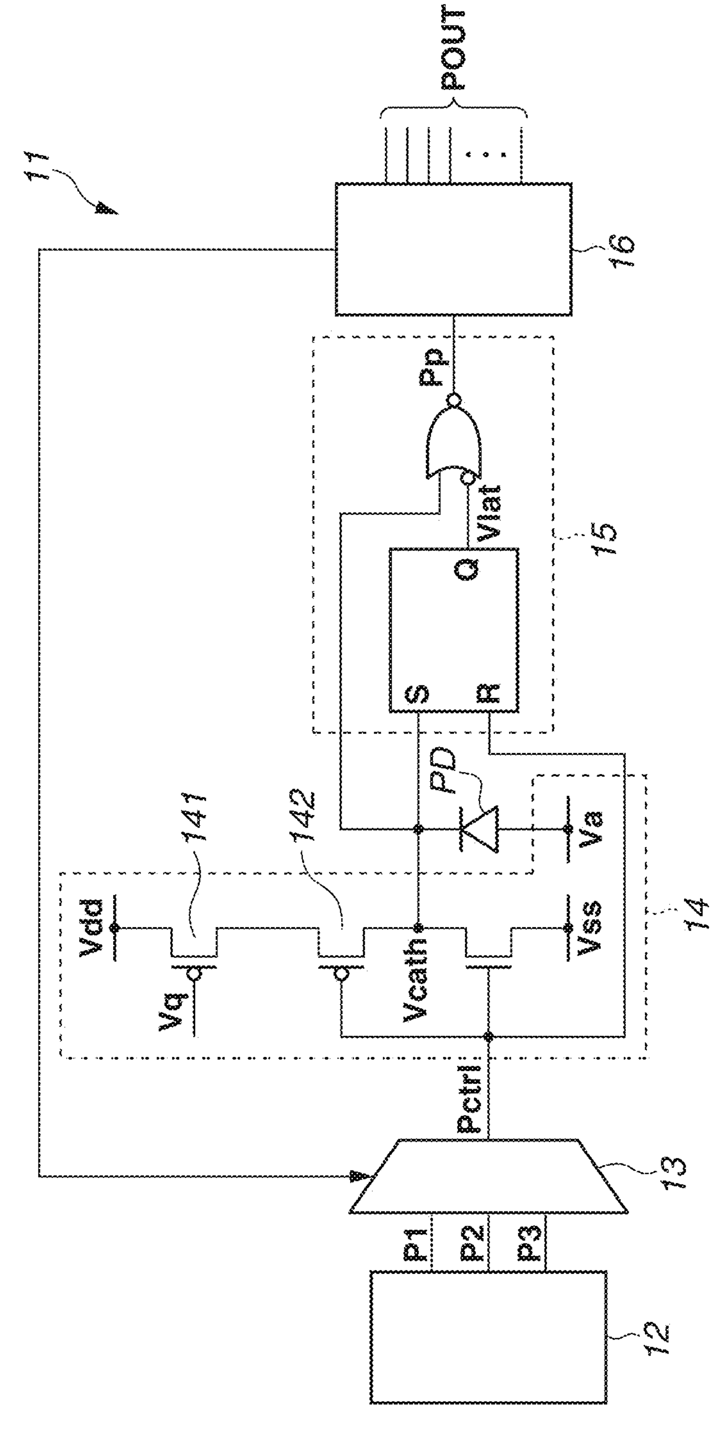
FIG. 7 illustrates an example of a configuration of a pixel.

FIG. 7 illustrates a configuration of the pixel 11 according to the present exemplary embodiment. In the present exemplary embodiment, the photoelectric conversion apparatus is different from the first exemplary embodiment in the configuration of the PD control circuit 14.

In the PD control circuit 14 according to the present exemplary embodiment, a PMOS transistor 141 and a PMOS transistor 142 are connected to each other in a cascade manner. A voltage Vq input to a gate of the PMOS transistor 141 is a voltage that brings about a conductive state between a source and a drain of the PMOS transistor 141. The PMOS transistor 142 is configured such that a parasitic capacitance thereof falls below a parasitic capacitance of the PMOS transistor 141. Typically, the size of the PMOS transistor 142 is smaller than the size of the PMOS transistor 141. The size of the transistor can be reduced by, for example, forming the transistor such that at least one of the gate length and the gate width is reduced.

Then, the PMOS transistor connected to the photodiode PD is arranged so as to have a smaller parasitic capacitance in the present exemplary embodiment than the PMOS transistor of the PD control circuit 14 according to the first exemplary embodiment.

As a result, the photoelectric conversion apparatus can speed up the recharging operation after the voltage Vcath reduces due to the avalanche multiplication. Therefore, the photoelectric conversion apparatus can shorten the period from when the avalanche multiplication occurs until when the photodiode PD becomes ready for the avalanche multiplication again, compared to the first exemplary embodiment. Therefore, the photoelectric conversion apparatus can reduce the occurrence of omission in counting a photon and the count value does not increase even when a photon is incident on the photodiode PD.

In the following description, a third exemplary embodiment will be described. The present exemplary embodiment will be described, focusing on differences from the first exemplary embodiment.

Figure 8:
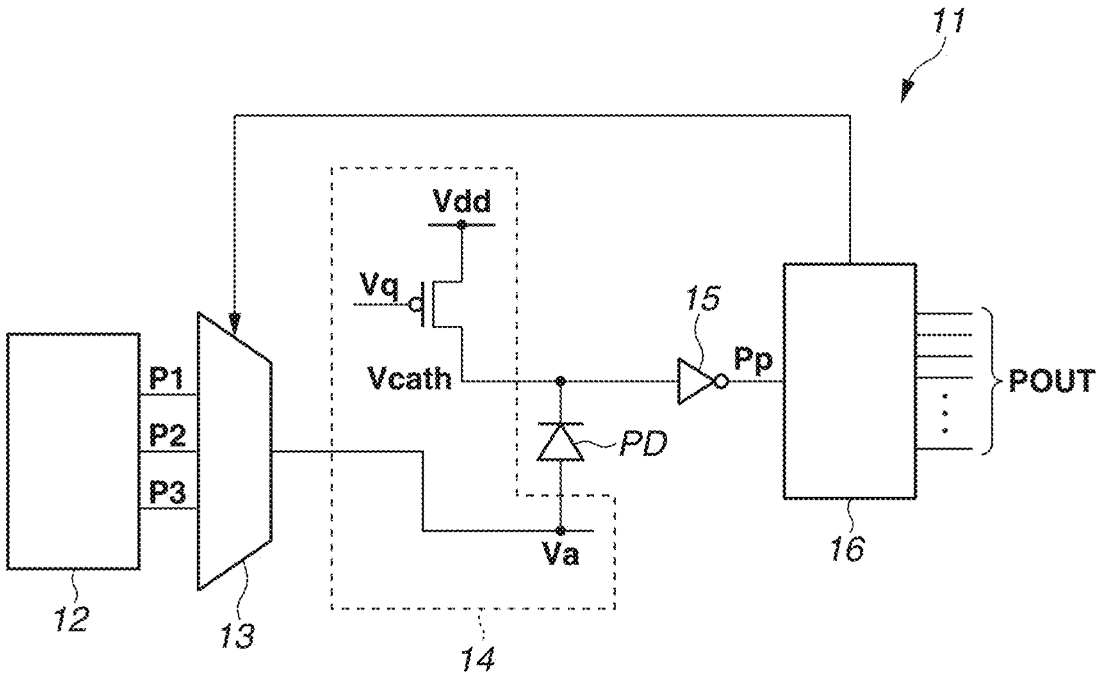
FIG. 8 illustrates an example of a configuration of a pixel.

FIG. 8 illustrates a configuration of the pixel 11 according to the present exemplary embodiment.

In the first exemplary embodiment, the selector 13 controls the avalanche waiting period and stop period of the photodiode PD by controlling the PMOS transistor (the recharging element) and the NMOS transistor of the PD control circuit 14. In the present exemplary embodiment, the avalanche waiting period and stop period of the photodiode PD are controlled by controlling a potential at the anode of the photodiode PD. Further, in the present exemplary embodiment, the waveform generation circuit 15 is configured as an inverter circuit.

The photoelectric conversion apparatus according to the present exemplary embodiment can be configured to operate in a similar manner to the first exemplary embodiment. Due to the configuration, the photoelectric conversion apparatus according to the present exemplary embodiment can also bring about similar advantageous effects to the photoelectric conversion apparatus 100 according to the first exemplary embodiment.

In the following description, a fourth exemplary embodiment will be described. The present exemplary embodiment will be described, focusing on differences from the first exemplary embodiment.

Figure 9:
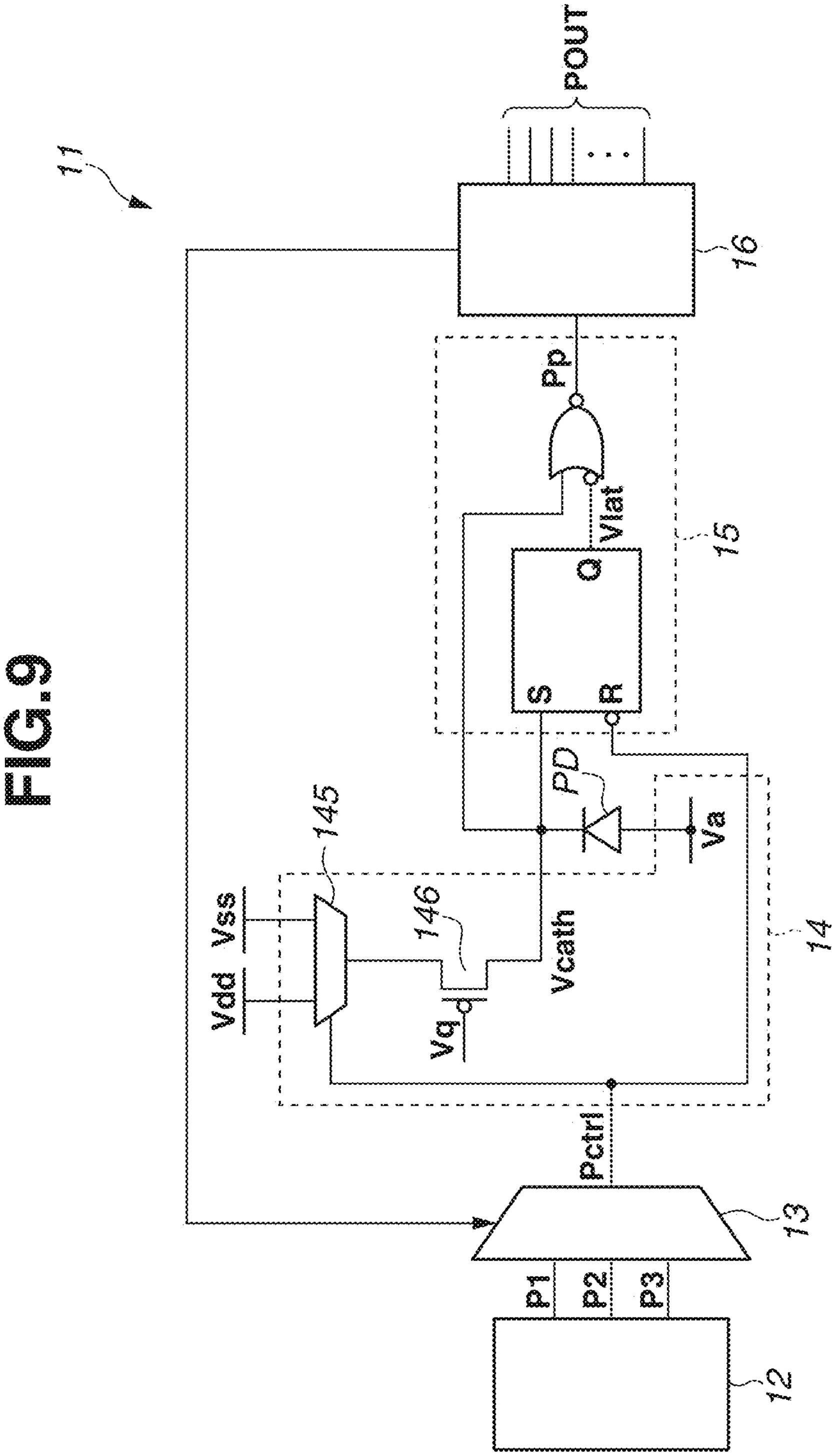
FIG. 9 illustrates an example of a configuration of a pixel.

FIG. 9 illustrates a configuration of the pixel 11 included in the photoelectric conversion apparatus according to the present exemplary embodiment.

In the photoelectric conversion apparatus according to the present exemplary embodiment, the PD control circuit 14 of the pixel 11 includes a selector 145 and a PMOS transistor 146. The voltage Vq input to a gate of the PMOS transistor 146 is a voltage that brings about a conductive state between a source and a drain of the PMOS transistor 146.

The signal Pctrl is input from the selector 13 to the selector 145. When the signal Pctrl is at the Low level, the selector 145 outputs the voltage Vdd to the PMOS transistor 146. When the signal Pctrl is at the High level, the selector 145 outputs the voltage Vss to the PMOS transistor 146. Therefore, the period during which the signal Pctrl is at the Low level corresponds to the avalanche waiting period, similarly to the first exemplary embodiment. Further, the period during which the signal Pctrl is at the High level corresponds to the stop period of the avalanche multiplication, similarly to the first exemplary embodiment.

The photoelectric conversion apparatus according to the present exemplary embodiment can be configured to operate in a similar manner to FIG. 5 described in the first exemplary embodiment.

In the present exemplary embodiment, the photoelectric conversion apparatus can also bring about similar advantageous effects to the photoelectric conversion apparatus 100 according to the first exemplary embodiment.

In the following description, a fifth exemplary embodiment will be described. The present exemplary embodiment will be described, focusing on differences from the first exemplary embodiment.

In the first exemplary embodiment, the plurality of pixels 11 each includes the pixel control circuit 12. In the present exemplary embodiment, a plurality of pixels 11 shares one pixel control circuit 12 among them.

Figure 10:
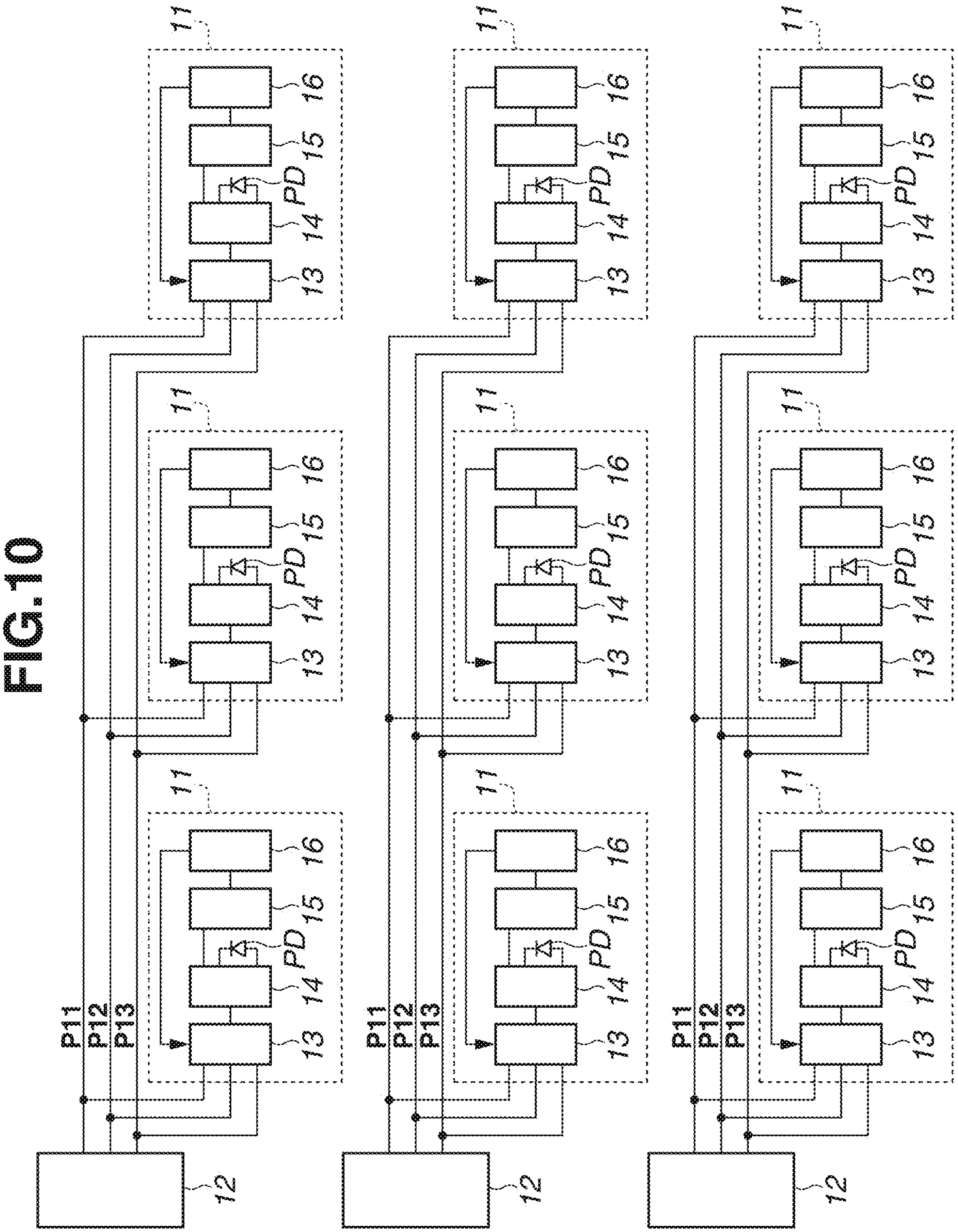
FIG. 10 illustrates an example of a configuration of a pixel.

FIG. 10 illustrates a configuration of the pixel unit in the photoelectric conversion apparatus according to the present exemplary embodiment. Pixels 11 in a plurality of columns that are laid out in one row share one pixel control circuit 12 among them. The pixel control circuit 12 of the first row outputs signals P11, P12, and P13 to the pixels 11 in the plurality of columns in the row corresponding thereto.

The signals P11, P12, and P13 are similar signals to the signals P1, P2, and P3 described in the first exemplary embodiment, respectively in this order. The photoelectric conversion apparatus according to the present exemplary embodiment can be configured to operate in a similar manner to FIG. 5 described in the first exemplary embodiment.

In this manner, the plurality of pixels 11 shares one pixel control circuit 12 among them in the present exemplary embodiment. Due to this configuration, the photoelectric conversion apparatus can reduce the number of pixel control circuits 12, thereby reducing the area of the circuit, compared to the first exemplary embodiment.

In the present exemplary embodiment, the photoelectric conversion apparatus is configured such that the plurality of pixels 11 laid out in one row and the plurality of columns shares one pixel control circuit 12 among them, but is not limited to this example. As another example, the photoelectric conversion apparatus may be configured such that a plurality of pixels 11 laid out in a plurality of rows and one column shares one pixel control circuit 12 among them. Alternatively, the photoelectric conversion apparatus may be configured such that the pixel array is divided into a plurality of blocks each including a plurality of pixels 11 in a plurality of rows and a plurality of columns, and the plurality of pixels 11 included in one block shares one pixel control circuit 12 among them.

The idea in the present exemplary embodiment can also be applied to the second to fourth exemplary embodiments. In other words, the pixel control circuit 12 described in each of the second to fourth exemplary embodiments may also be configured such that a plurality of pixels 11 shares the pixel control circuit 12 among them.

In the following description, a sixth exemplary embodiment will be described. A photoelectric conversion apparatus according to the present exemplary embodiment will be described, focusing on differences from the fifth exemplary embodiment.

In the fifth exemplary embodiment, the photoelectric conversion apparatus is configured such that the signals in the same phase are output from the plurality of pixel control circuits 12 as the signals P11 to P13. In the present exemplary embodiment, the photoelectric conversion apparatus is configured such that signals in a different phase from one another are output from the plurality of pixel control circuits 12.

Figure 11:
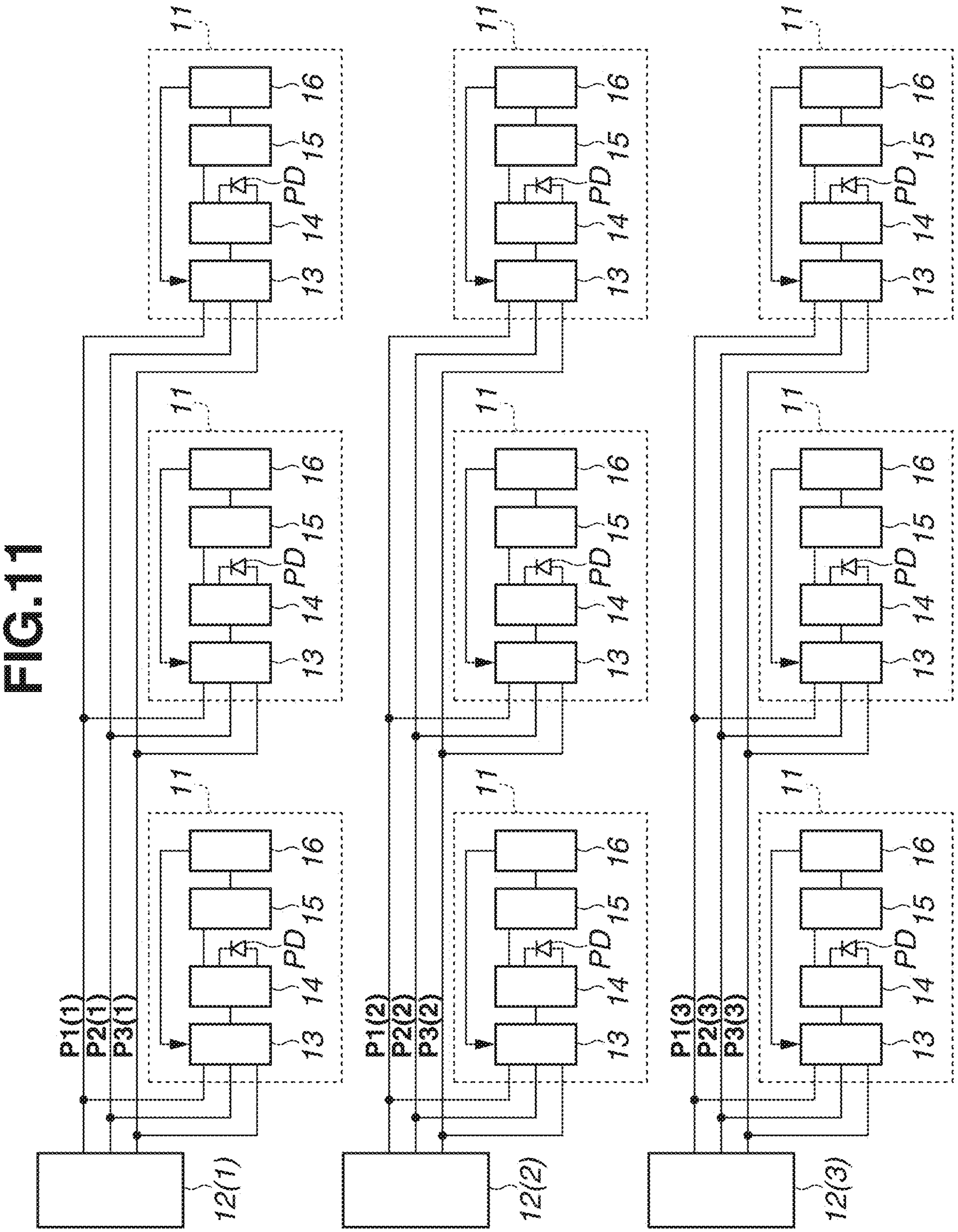
FIG. 11 illustrates an example of a configuration of a pixel.

FIG. 11 illustrates a configuration of the pixel unit in the photoelectric conversion apparatus according to the present exemplary embodiment.

In the present exemplary embodiment, (n) is added to an end of a reference numeral of a signal or a member, in the present disclosure and the drawings when indicating the row position. The index (n) indicates that the signal or member corresponds to the n-th row.

The pixel control circuit 12(1) of the first row outputs the signals P1(1) to P3(1) to the pixels 11 in the plurality of columns in the row corresponding thereto.

The pixel control circuit 12(2) of the second row outputs the signals P1(2) to P3(2) to the pixels 11 in the plurality of columns in the row corresponding thereto.

The pixel control circuit 12(3) of the third row outputs the signals P1(3) to P3(3) to the pixels 11 in the plurality of columns in the row corresponding thereto.

Figure 12:
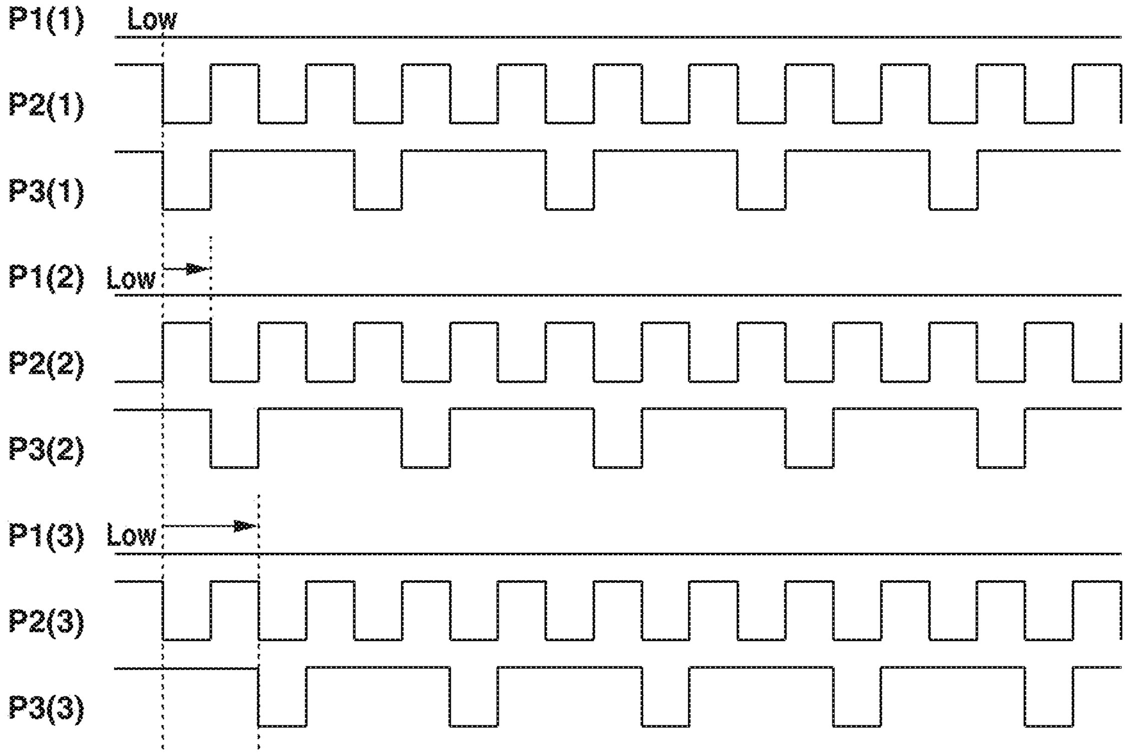
FIG. 12 is a timing chart illustrating an operation of the pixel.

FIG. 12 illustrates an operation of the pixel 11 according to the present exemplary embodiment. Each signal illustrated in FIG. 12 corresponds to each signal illustrated in FIG. 11.

The signals P1(1), P1(2), and P1(3) are kept constant at the Low level.

The signals P2(1), P2(2), and P2(3) are signals having the same cycle. The signals P2(1) and P2(2) have an opposite phase to each other. The signals P2(1) and P2(3) have the same phase.

The signals P3(1), P3(2), and P3(3) are signals having the same cycle. The signal P3(2) is a signal delayed in phase behind the signal P3(1) (by a half of the cycle of the signal P2). Similarly, the signal P3(3) is a signal delayed in phase behind the signal P3(2) (by the half of the cycle of the signal P2). The signal P3(3) is a signal delayed in phase behind the signal P3(1) by the cycle of the signal P2.

The avalanche current due to the avalanche multiplication causes the voltage change at the node which supplies the voltage Vdd. A potential change of the voltage Vdd becomes significant as the pixels 11 where the avalanche multiplication occurs at the same time, increases in the number. This leads to a delay in the recharging operation of the PD control circuit 14, a false operation of another circuit element, and a reduction in operational accuracy.

In the present exemplary embodiment, the signal P2(*n*) of the pixel control circuit 12(*n*) of some row and the signal P2(*m*) of the pixel control circuit 12(*m*) of another row have different phases. This allows the avalanche waiting periods to happen at different timings between the pixel 11 in which the avalanche multiplication is controlled by the signal P2(*n*) and the pixel 11 in which the avalanche multiplication is controlled by the signal P2(*m*). As a result, the photoelectric conversion apparatus can reduce the number of pixels where the avalanche multiplication is caused at the same time, thereby suppressing the potential change of the voltage Vdd.

Similarly, the signal P3(*n*) of the pixel control circuit 12(*n*) of some row and the signal P3(*m*) of the pixel control circuit 12(*m*) of another row have different phase from each other. This allows the avalanche waiting periods to happen at different timings between the pixel 11 in which the avalanche multiplication is controlled by the signal P3(*n*) and the pixel 11 in which the avalanche multiplication is controlled by the signal P3(*m*).

In this manner, the photoelectric conversion apparatus according to the present exemplary embodiment makes the signals output from some pixel control circuit 12 and another pixel control circuit 12 have different phases from each other. As a result, the photoelectric conversion apparatus can reduce the number of pixels where the avalanche multiplication is caused at the same time, thereby suppressing the potential change of the voltage Vdd.

The photoelectric conversion apparatus has been described in the present exemplary embodiment referring to the example in which the signal P2(2) is delayed behind the signal P2(1) by the half of the cycle, but the delay amount of the signal can be arbitrarily selected.

Similarly, a delay amount different from the present exemplary embodiment can also be arbitrarily selected for the signal P3(2) with respect to the signal P3(1).

Figure 13:
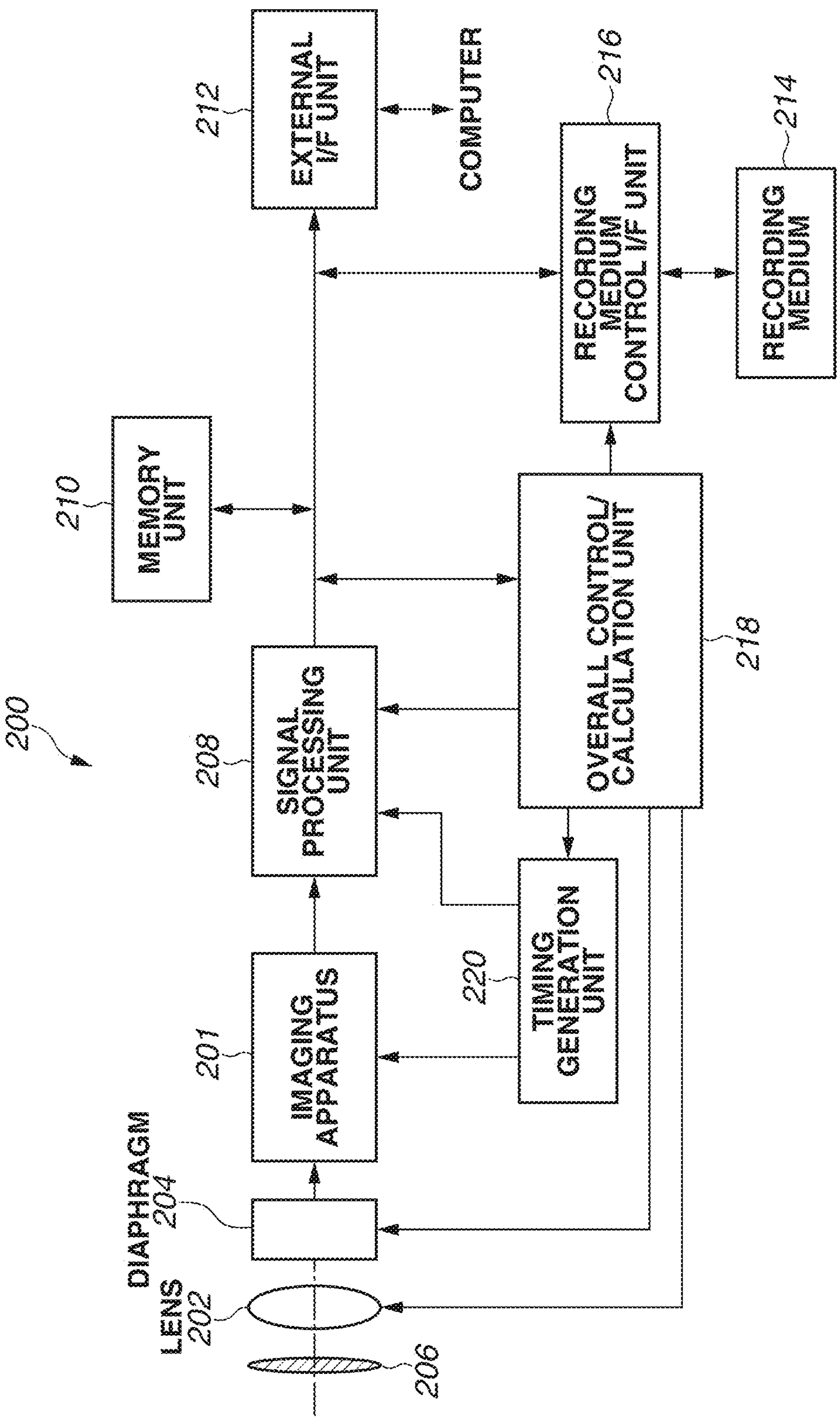
FIG. 13 is a block diagram illustrating a schematic configuration of an imaging system.

An imaging system according to a seventh exemplary embodiment of the disclosure will be described with reference to FIG. 13. FIG. 13 is a block diagram illustrating a schematic configuration of the imaging system according to the present exemplary embodiment.

The photoelectric conversion apparatus 100 described in the above-described first to sixth exemplary embodiments is applicable to various imaging systems. Examples of the imaging systems to which the photoelectric conversion apparatus 100 is applicable include a digital still camera, a digital camcorder, a monitoring camera, a copying machine, a facsimile machine, a mobile phone, an in-vehicle camera, and an observatory satellite. Further, the imaging systems also include a camera module including an optical system such as a lens and an imaging apparatus, for example. FIG. 13 exemplarily illustrates a block diagram of the digital still camera as an example of them.

An imaging system 200 exemplarily illustrated in FIG. 13 includes an imaging apparatus 201, a lens 202 for forming an optical image of a subject on the imaging apparatus 201, a diaphragm 204 for passing light through the lens 202 by a variable light amount, and a bather 206 for protecting the lens 202. The lens 202 and the diaphragm 204 are an optical system that collects the light onto the imaging apparatus 201. The imaging apparatus 201 is the photoelectric conversion apparatus 100 described in the first to fifth exemplary embodiments, and converts the optical image formed by the lens 202 into image data.

The imaging system 200 further includes a signal processing unit 208, which processes a signal output from the imaging apparatus 201. The signal processing unit 208 carries out an AD conversion of converting an analog signal output from the imaging apparatus 201 into a digital signal. Further, the signal processing unit 208 carries out various kinds of corrections and compressions as necessary to output the image data. An AD conversion unit, which is a part of the signal processing unit 208, may be formed on a semiconductor substrate on which the imaging apparatus 201 is mounted or may be formed on a different semiconductor substrate from the imaging apparatus 201. Further, the imaging apparatus 201 and the signal processing unit 208 may be formed on the same semiconductor substrate.

The imaging system 200 further includes a memory unit 210 for temporarily storing the image data, and an external interface unit (an external I/F unit) 212 for communicating with an external computer and the like. The imaging system 200 further includes a recording medium 214 such as a semiconductor memory for recording or reading out the imaging data, and a recording medium control interface unit (a recording medium control I/F unit) 216 for allowing the imaging data to be recorded into or read out from the recording medium 214. The recording medium 214 may be built within the imaging system 200 or may be detachably mounted.

The imaging system 200 further includes an overall control/calculation unit 218, which controls various kinds of calculations and the entire digital still camera, and a timing generation unit 220, which outputs various kinds of timing signals to the imaging apparatus 201 and the signal processing unit 208. The timing signal and the like may be input from the outside of the imaging system 200, and the imaging system 200 may have a different configuration as long as the imaging system 200 includes at least the imaging apparatus 201, and the signal processing unit 208 that processes the output signal output from the imaging apparatus 201.

The imaging apparatus 201 outputs an imaging signal to the signal processing unit 208. The signal processing unit 208 performs predetermined signal processing on the imaging signal output from the imaging apparatus 201, and outputs the image data. The image processing unit 208 generates the image by using the imaging signal.

In this manner, according to the present exemplary embodiment, the imaging system to which the photoelectric conversion apparatus 100 according to the first to sixth exemplary embodiments is applied can be realized.

Figure 14A:
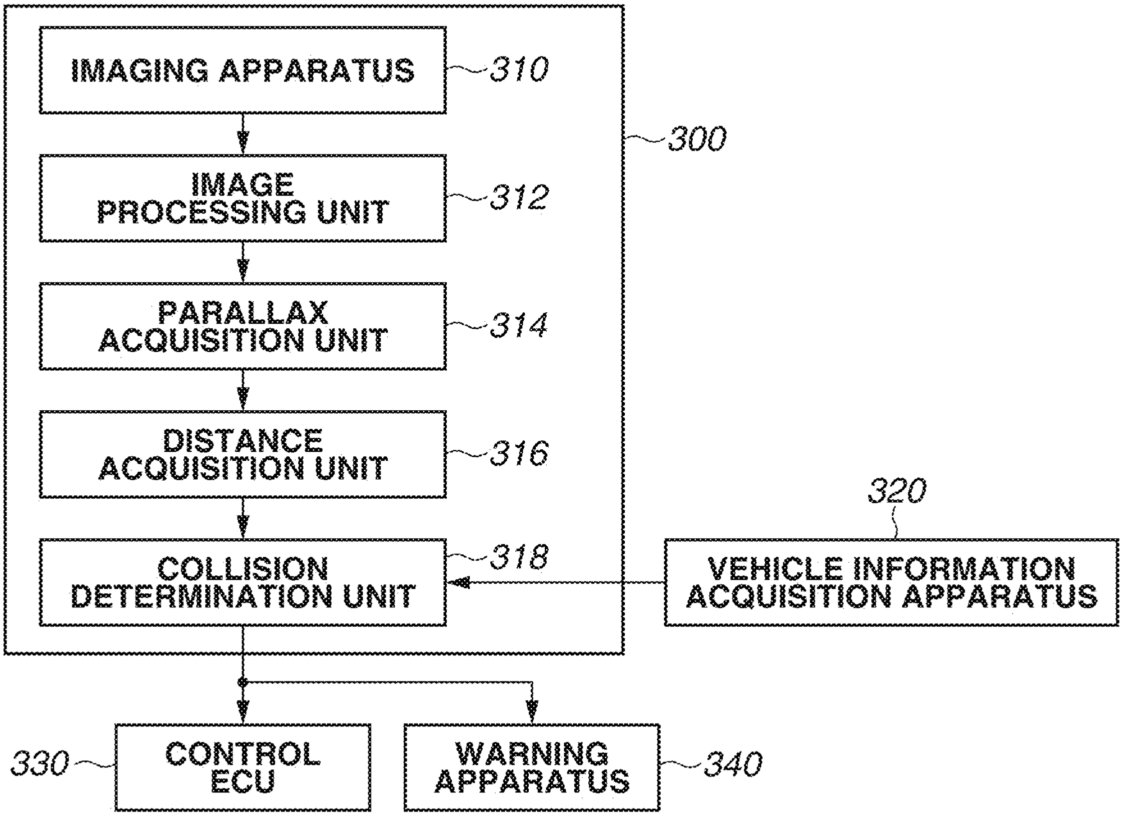
FIGS. 14A and 14B illustrate an example of a configuration of an imaging system and a moving object.
Figure 14B:
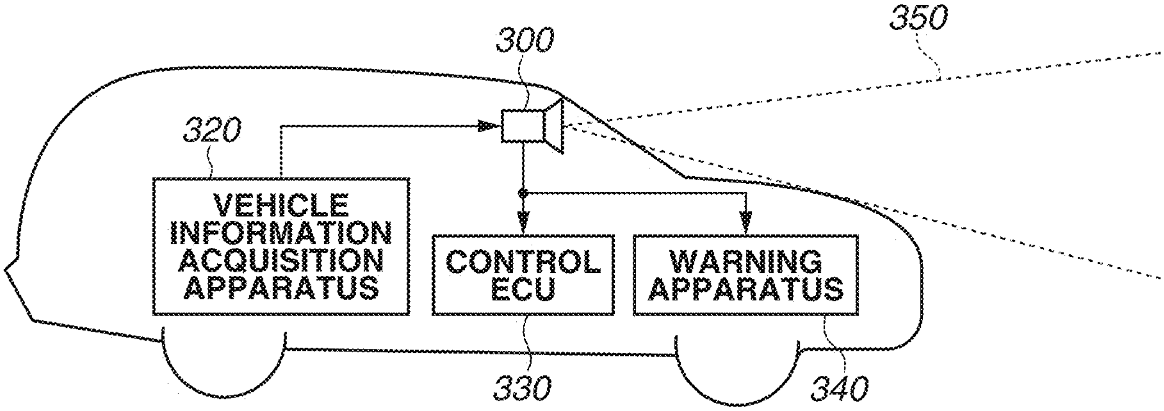

An imaging system and a moving object according to an eighth exemplary embodiment of the disclosure will be described with reference to FIGS. 14A and 14B. FIGS. 14A and 14B illustrate a configuration of the imaging system and the moving object according to the present exemplary embodiment.

FIG. 14A illustrates an example of an imaging system regarding the in-vehicle camera. An imaging system 300 includes an imaging apparatus 310. The imaging apparatus 310 is the photoelectric conversion apparatus 100 described in any of the above-described first to sixth exemplary embodiments. The imaging system 300 includes an image processing unit 312, which performs image processing on a plurality of pieces of image data acquired by the imaging apparatus 310, and a parallax acquisition unit 314, which calculates a parallax (a phase difference between parallax images) from the plurality of pieces of image data acquired by the imaging system 300. Further, the imaging system 300 includes a distance acquisition unit 316, which calculates a distance to a target based on the calculated parallax, and a collision determination unit 318, which determines whether there is a collision possibility based on the calculated distance. The parallax acquisition unit 314 and the distance acquisition unit 316 are an example of a distance information acquisition unit that acquires information about distance to the target. In other words, the distance information refers to information regarding the parallax, a defocus amount, the distance to the target, and the like. The collision determination unit 318 may determine the collision possibility using any of these pieces of distance information. The distance information acquisition unit may be realized by hardware designed specially therefor or may be realized by a software module. Alternatively, the distance information acquisition unit may be realized by a field programmable gate array (FPGA), an application specific integrated circuit (ASIC), or the like, or may be realized by a combination of them.

The imaging system 300 is connected to a vehicle information acquisition apparatus 320, and can acquire vehicle information, such as a vehicle speed, a yaw rate, and a steering angle. Further, the imaging system 300 is connected to an electronic control unit (ECU) 330, which is a control apparatus that outputs a control signal for generating a braking force for the vehicle based on a result of the determination by the collision determination unit 318. Further, the imaging system 300 is also connected to a warning apparatus 340, which issues a warning to a driver based on the result of the determination by the collision determination unit 318. For example, when the collision possibility is high as the result of the determination by the collision determination unit 318, the control ECU 330 controls the vehicle to avoid the collision or reduce damage by, for example, braking the vehicle, returning an accelerator, and/or reducing an engine output. The warning apparatus 340 warns the user by, for example, sounding a warning, for example, displaying warning information on a screen of a car navigation system or the like, and/or vibrating a seat belt or a steering wheel.

In the present exemplary embodiment, surroundings of the vehicle, such as the front or the rear of the vehicle, are imaged by the imaging system 300. FIG. 14B illustrates the imaging system 300 when the imaging system 300 images the front of the vehicle (an imaging range 350). The vehicle information acquisition apparatus 320 transmits an instruction to the imaging system 300 or the imaging apparatus 310. Owing to such a configuration, the distance can be measured with much improved accuracy.

In the above description, the imaging system 300 has been described referring to the example that performs control so as to prevent the vehicle from colliding with another vehicle, but is also applicable to control performed to autonomously drive the vehicle so as to cause the vehicle to follow another vehicle, to autonomously drive the vehicle so as to prevent the vehicle from departing from a traffic lane, and the like. Further, the imaging system 300 is applicable to not only a vehicle such as the car on which the imaging system 300 itself is mounted, but also a moving object (a moving apparatus) such as a ship, an airplane, or an industrial robot. In addition, the imaging system 300 is applicable to not only the moving object but is also widely applicable to an apparatus using object recognition, such as an intelligent transportation system (ITS).

Modified Exemplary Embodiments

The disclosure can be modified in various manners without limitation to the above-described exemplary embodiments.

For example, embodiments of the disclosure also include examples in which a part of the configuration of any of the exemplary embodiments is added to another exemplary embodiment or a part of the exemplary embodiments is replaced with a part of another exemplary embodiment.

Further, the imaging systems described in the above-described seventh and eighth exemplary embodiments show examples of the imaging systems to which the photoelectric conversion apparatus according to the disclosure is applicable, and the imaging systems to which the photoelectric conversion apparatus according to the disclosure is applicable is not limited to the configurations illustrated in FIGS. 13, and 14A and 14B.

Any of the above-described exemplary embodiments merely shows an example of how to specifically embody the disclosure when implementing the disclosure, and the technical scope of the disclosure is not construed limited to them. In other words, the disclosure can be implemented in various manners without departing from the technical idea thereof or the main features thereof.

According to the disclosure, the power consumption of the pixel can be reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A photoelectric conversion apparatus comprising:

a photodiode to which a first voltage and a second voltage are supplied, the photodiode being an avalanche-multiplication-type photodiode;

a counter configured to count a pulse generated at the photodiode, and hold a count value;

a control circuit configured to control the first voltage to be supplied to the photodiode; and at least one processor;

a memory coupled to the at least one processor storing instructions that, when executed by the at least one processor, cause the at least one processor to function as:

a correction unit configured to correct the count value output from the counter, wherein a signal input into the control circuit has a first level at which the first voltage is supplied to the photodiode via the control circuit and a second level at which the first voltage is not supplied to the photodiode, and wherein, in a case where the count value output from the counter exceeds a threshold value, the correction unit corrects a count value at which a gradient of the count value with respect to a number of photons incident on the photodiode in a range exceeding the threshold value falls in a range different from a gradient a of the count value with respect to a number of photons until the count value reaches the threshold value so as to match the gradient a, wherein the count value is corrected based on a following equation (A), $$Nx2 = n \cdot Nx1 - (n-1) \cdot N1 \quad \text{(A)}$$

where,

Nx2 represents the count value after correction, n represents a length of a period of the first level/(the length of the period of the first level+a length of a period of the second level) after the count value reaches the threshold value, Nx1 represents the count value before the correction, and N1 represents the threshold value.

2. The photoelectric conversion apparatus according to claim 1, wherein a period from resetting the count value of the counter to reading the count value of the counter includes a first period and a second period that is after the first period, wherein the second period is a period after the count value reaches the threshold value, wherein, in the first period, a ratio of a length of the second level to a length of the first level is a first value, wherein, in the second period, a ratio of a length of the second level to a length of the first level is a second value, and wherein the second value is greater than the first value.

3. The photoelectric conversion apparatus according to claim 2, wherein, in the first period, the signal input into the control circuit is kept at the first level, and wherein, in the second period, the signal input into the control circuit is set at the first level and at the second level sequentially more than once.

4. The photoelectric conversion apparatus according to claim 2, wherein, in the first period, the signal input into the control circuit is set at the first level and at the second level sequentially more than once, and wherein, in the second period, the signal input into the control circuit is set at the first level and at the second level sequentially more than once.

5. The photoelectric conversion apparatus according to claim 2, wherein the period further includes a third period that is after the second period, wherein the third period is a period after the count value reaches a second threshold value that is greater than the threshold value, wherein, in the third period, the signal input into the control circuit is set at the first level and at the second level sequentially more than once, and wherein a length of the second level in the third period is greater than a length of the second level in the second period.

6. The photoelectric conversion apparatus according to claim 1, wherein the control circuit includes a recharging circuit, wherein a recharging operation is performed by the recharging circuit when a signal having the first level is input into the control circuit, and wherein the recharging operation by the recharging circuit is stopped when a signal having the second level is input into the control circuit.

7. The photoelectric conversion apparatus according to claim 1, wherein the first voltage is a voltage to be supplied to an anode of the photodiode, wherein the second voltage is a voltage to be supplied to a cathode of the photodiode, and wherein the control circuit is configured to change a potential at the anode of the photodiode.

8. The photoelectric conversion apparatus according to claim 1, wherein the first voltage is a voltage to be supplied to a cathode of the photodiode, wherein the second voltage is a voltage to be supplied to an anode of the photodiode, and wherein the control circuit is configured to change a potential at the cathode of the photodiode.

9. The photoelectric conversion apparatus according to claim 1, further comprising a plurality of pixels including the photodiode, wherein the control circuit includes a control signal generation unit, and wherein the control signal generation unit of the control circuit is connected in common to the plurality of pixels.

10. The photoelectric conversion apparatus according to claim 1, wherein the photodiode is mounted on a first semiconductor substrate, and the counter is mounted on a second semiconductor substrate, wherein the first semiconductor substrate and the second semiconductor substrate are stacked.

11. An imaging system comprising:

the photoelectric conversion apparatus according to claim 1; and a signal processing unit configured to process a signal output from the photoelectric conversion apparatus.

12. A moving object comprising:

the photoelectric conversion apparatus according to claim 1;

a distance information acquisition unit configured to acquire distance information about a distance to a target, from a parallax image based on a signal from the photoelectric conversion apparatus; and a controller configured to control the moving object based on the distance information.

* * * * *